Figure 1:
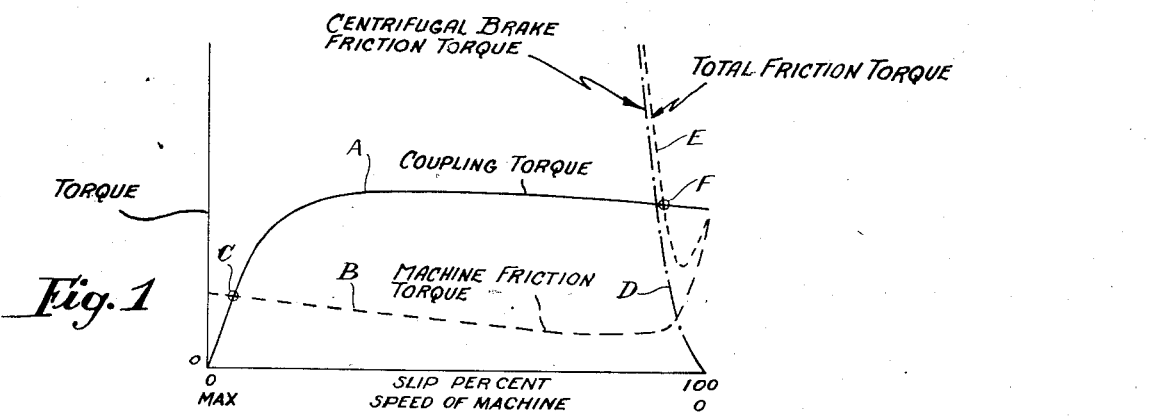

June 1, 1943.  H. SINCLAIR  2,320,758

ROTARY POWER TRANSMISSION MECHANISM

Filed Feb. 8, 1941

Inventor
Harold Sinclair
by
his Attorneys

Patented June 1, 1943

2,320,758

UNITED STATES PATENT OFFICE 2,320,758

ROTARY POWER TRANSMISSION MECHANISM

Harold Sinclair, Kensington, London, England

Application February 8, 1941, Serial No. 377,943
In Great Britain March 1, 1940

1 Claim. (Cl. 192—12)

This invention relates to rotary power-transmission mechanism adapted for use in driving a machine, such for example as a calender for paper or rubber, which is required to run alternatively at a creeping speed, for example when feeding the work into the machine, and at a higher normal running speed.

A common way of driving such a machine at a creeping speed is through a barring gear consisting of an auxiliary motor, a reduction gear, and a disengageable clutch, e. g. a free-wheel device. A barring gear of this kind is, however, relatively expensive, and an object of this invention is to provide simple and easily controllable means whereby the main driving motor may be employed to provide the creeping speed.

This invention involves the provision of a hydraulic coupling of the kinetic type between the driving motor and the driving member of the machine, and at first sight it might be thought that it would be possible to start the machine from rest and cause it to run at a creeping speed by using a hydraulic coupling of the variable filling type, by allowing the motor to run continuously while the working circuit of the coupling was empty, and by adjusting the partial filling of the working circuit so that the slip in the coupling would be substantial. This mode of operation however is either not convenient owing to the delicacy of adjustment, or is frequently not possible in connection with machines having a high static friction (namely the friction which has to be overcome when the machine is started from rest), for the following reason. The static friction is usually substantially higher than the friction which has to be overcome when the machine begins to run. In other words, the curve relating driving torque to speed drops steeply as the speed increases initially from zero, and thereafter remains flat or may rise gently as the speed approaches its normal value. The characteristic curve of the hydraulic coupling relating torque transmitted to slip (slip being inversely proportional to the speed of the machine when the motor speed is constant) for a given degree of filling slopes upward from the origin over at least part of the slip range, and the torque/slip curves representing respectively different degrees of filling lie one over another in corresponding order, the minimum degree of filling yielding naturally the minimum torque-transmission capacity. Furthermore there is transient tendency not indicated by the graph referred to hereinafter for the torque transmission capacity to rise somewhat as soon as the runner commences to rotate, thus causing quick acceleration.

Consequently, if it were attempted to start the machine by allowing the motor to run at its normal speed and by partly filling the coupling, the machine would remain at rest until the filling was such that the torque-transmission capacity of the coupling exceeded the starting torque of the machine. Thereupon the machine would begin to run, and as its speed increased and the slip in the coupling fell correspondingly the torque required to keep the machine running would initially fall to substantially less than the torque transmitted by the hydraulic coupling, with the result that the machine would be accelerated until the slip decreased so far that the torque transmitted by the coupling equalled the driving torque of the idling machine, which by then would be running faster than the desired creeping speed. If it were then attempted to reduce the speed of the machine by reducing the filling of the hydraulic coupling, it would be found that, before the speed had dropped to the desired creeping value, the friction curve was rising above the torque curve, so that the machine would stop.

A sufficiently low creeping speed can be attained by partially filling the coupling in the manner just described if the frictional load is artificially increased by means of an adjustable brake which is applied to the driving mechanism on the driven side of the hydraulic coupling after the driven machine has begun to run. Even with this arrangement, however, it is necessary, after the machine has started, to obtain a rather critical relationship between filling of the coupling and the braking torque; and it is obvious that juggling with filling and braking control members would be a nuisance to the operator when he was concerned with attending to the machine itself, e. g. feeding work into it.

Driving mechanism according to the present invention enables the operator to obtain a suitable creeping speed without any critical adjustment of control members.

Figure 2:
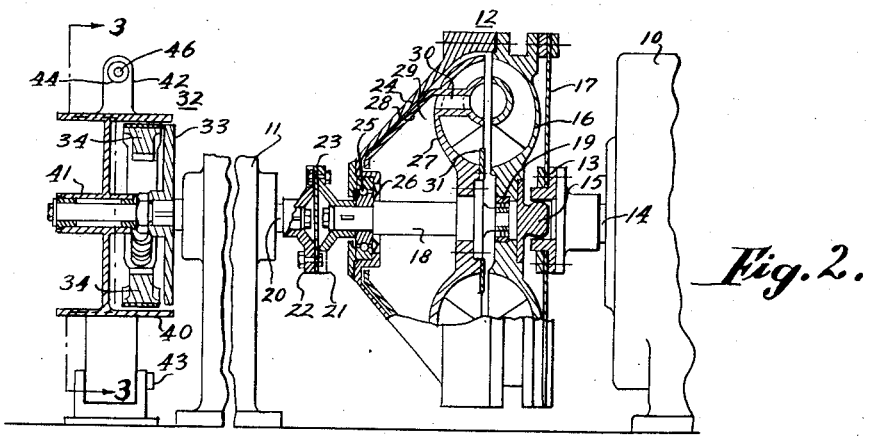
Figure 3:
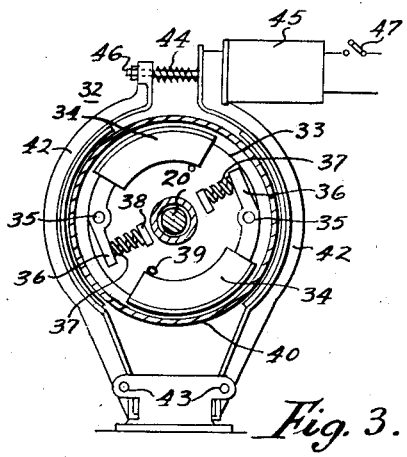

The invention will be further described with reference to the accompanying drawing in which:

Fig. 1 is a diagrammatic graph showing the relationship of torque to slip and speed, Fig. 2 is a part-sectional side elevation of one form of the improved power-transmission mechanism, and Fig. 3 is a section taken on the line 3—3 in Fig. 2.

Referring to Figs. 2 and 3, an electric motor 10 is arranged to drive a driven machine 11, for example a calender for paper, through a Vulcan-Sinclair hydraulic coupling 12 of the standard "traction" type. A hollow boss 13 is fixed to the shaft 14 of the motor, and accommodates a part-spherical spigot 15 on a vaned impeller 16 which is drivably connected to the boss 13 by a flexible steel diaphragm 17. An intermediate shaft 18 is journalled by a roller bearing 19 in the hub of the impeller 16 at one end and its other end is connected to the driving shaft 20 of the driven machine 11 by a flexible coupling consisting of two spiders 21 and 22 fixed respectively to the shafts 18 and 20 and united by a laminated steel disc 23. A conical casing 24 is fixed at its periphery to the impeller 16 and is journalled on the shaft 18 by a deep-groove ball bearing 25 provided with a sealing diaphragm 26 of the kind described in United States patent specification No. 2,151,730. A vaned runner 27 is fixed to the shaft 18 and is provided with an inner shell 28 forming a rotary reservoir 29 which communicates with the working circuit by ducts 30. An annular baffle 31 is fixed to the boss of the runner 27 and projects into the working circuit for the purpose of reducing in known manner the drag torque of the coupling when the slip is high. With this type of coupling some of the working liquid is automatically transferred from the working circuit to the reservoir chamber when the slip is high, so that the torque/slip characteristic curve becomes substantially parallel to the slip axis at high values of slip.

The driving shaft 20 of the machine 11 is extended beyond this machine and carries a brake 32 consisting of a centrifugally controlled friction brake the braking element of which is adapted to be restrained by a manually controllable friction brake. The brakeable part of the centrifugally controlled brake consists of a disk 33 fixed to the shaft 20 and two friction shoes 34 pivotally mounted on pins 35 fixed in the disk 33. These shoes have tails 36 acted on by light springs 37 compressed against lugs 38 on the disk 33, so that the shoes are urged radially inwards against stop pins 39. The braking part of this brake consists of a drum 40 having a hub 41 journalled on the shaft 20. The shoes 34 co-operate with the inner surface of the drum 40. The manually controllable brake includes two friction shoes 42 mounted on fixed pivots 43 and normally kept clear of the drum 40 by a compression spring 44. The shoes 42 can be engaged with the drum 40 by closing an electrical switch 47 to energise a solenoid 45 which is fixed to one of the shoes and acts on the other of the shoes through a pull rod 46.

The operation of this mechanism is shown graphically in Fig. 1 which shows the relationship of torque plotted vertically to slip and speed plotted horizontally. At the origin both torque and slip are zero and the speed of the machine is the maximum. Curve A is the torque/slip characteristic of the coupling 12, the driving motor 10 being assumed to be running at constant speed. Curve B denotes the friction of the machine 11, and rises sharply over the speed range below 10% to a maximum at zero speed. Curve D is the parabola representing the characteristic of the centrifugal friction brake 34, 40. Curve E is the sum of the machine friction torque and the brake torque. When it is desired to run the machine at a creeping speed, the brake shoes 42 are fully applied to the drum 40 by closing the switch 47 and the motor 10 is started. When the speed of the impeller 16 has risen sufficiently to cause the coupling 12 in its stalled condition to transmit a torque exceeding the static friction torque of the machine 11, the machine starts and the centrifugally controlled portion of the brake 32 applies a load which increases with the speed according to curve D, the total torque varying according to curve E. The machine accelerates to the point F where the curves A and E intersect and which represents the stable creeping speed of the machine. When the machine is required to be accelerated to its normal speed, the switch 47 is opened to release the shoes 42 from the drum 40, and the machine 11 accelerates to the speed represented by the point C.

As the brake in the improved arrangements according to this invention is required to absorb only a part of the torque load on the motor and is working only at the creeping speed, the energy required to be dissipated by the brake is conveniently low in relation to its size, and the creeping condition can be sustained for most requirements in practice without undue heating.

I claim:

An apparatus for driving a machine alternatively at a creeping speed and at a higher normal running speed, said mechanism including a driving member for said machine, a driving motor, a hydraulic coupling of the kinetic type having an impeller connected to said motor and a runner connected to said driving member, a brake drum independent of said hydraulic coupling, a rotatable braking element on said driving member for engaging said brake drum and having a brake torque characteristic rising automatically with speed, and a second braking element operable for retaining or releasing said brake drum.

HAROLD SINCLAIR.